Jan. 6, 1931.  A. W. CHAPMAN  1,787,472
SLIDABLE SEAT
Filed Nov. 23, 1927
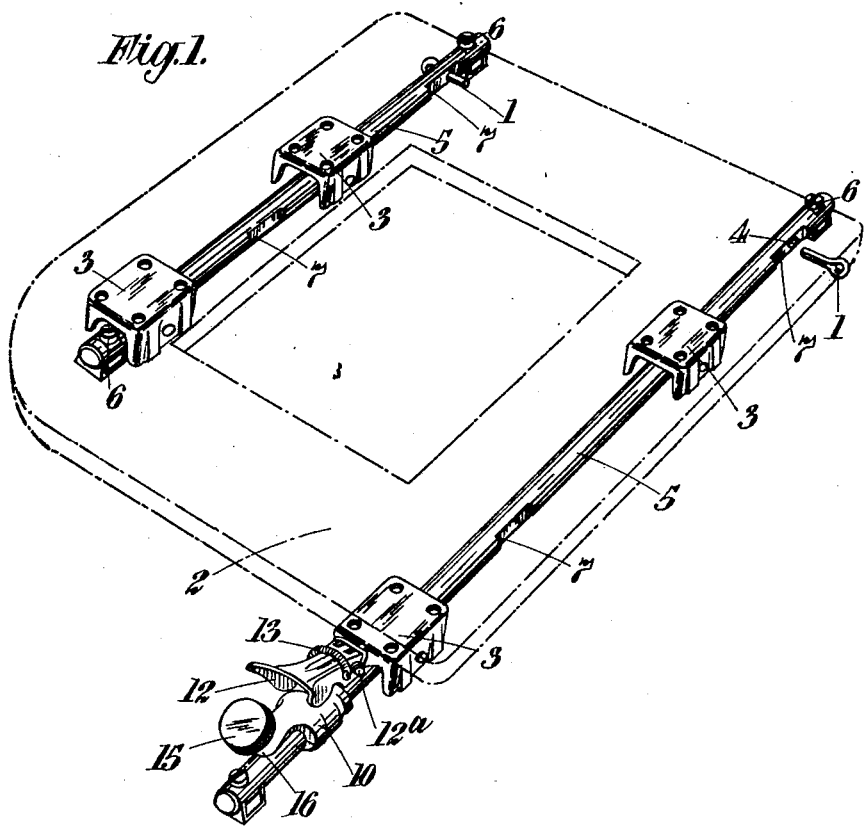
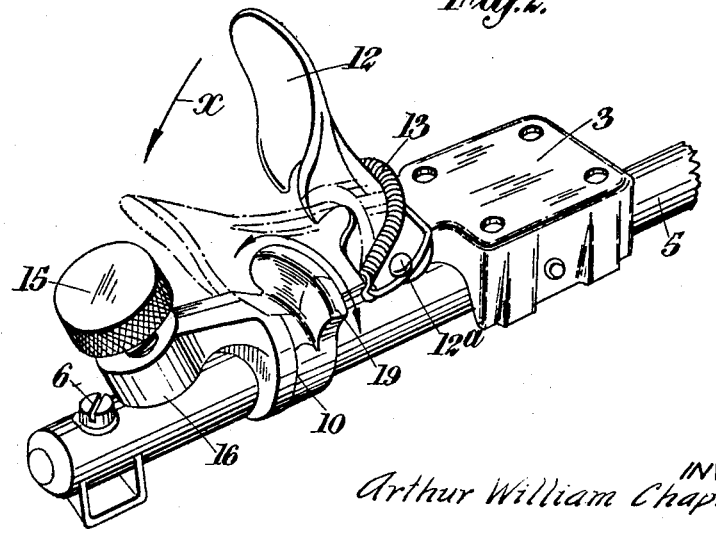
INVENTOR
Arthur William Chapman
BY
Charles H. Kisler
ATTORNEY Patented Jan. 6, 1931

1,787,472

UNITED STATES PATENT OFFICE

ARTHUR WILLIAM CHAPMAN, OF PUTNEY, LONDON, ENGLAND

SLIDABLE SEAT

Application filed November 23, 1927, Serial No. 235,380, and in Great Britain February 15, 1927.

This invention relates to improvements in seats which are slidable in order that they may be quickly and easily adjusted to meet requirements which are not satisfied by the usual methods of adjustment known previously. Primarily, the present invention is intended for the seats of motor cars, but its usefulness may render it applicable to other purposes also.

Generally speaking, adjustable seat fittings are designed for the sole purpose of enabling the seat to be held temporarily in a selected position chosen for its convenience. Such seats, according to known methods, are usually so mounted that they are difficult to move, and they always introduce a lot of trouble and waste of time in manipulating the adjustments or in finding precisely the correct position of registration for the interlocking parts to engage with one another.

Motors cars are frequently designed, to name one important instance, with a door on the driver's (i. e. offside) side of the car, besides the other door which is always to be found on the near side. Some of these cars have the gear lever and brake handle on the right hand side. The majority of motor car bodies, especially those of small dimensions, provide only a restricted door space, so that not only is an adjustable seat imperative, but a means of readily sliding the seat backwards is an added necessity in order to allow sufficient space to enable the driver to enter and leave the car, providing an equivalent to the advantage of having wider doors, which are impracticable in a small car body. The essential feature of the present invention lies in its provision for ensuring that the slidable seat upon being returned to its former position shall automatically lock upon a fixed adjustable stop which constitutes the abutment for limiting the forward motion of the seat. The certainty of achieving locking or anchoring engagement is assured by special provision which is described fully below.

An example of the present invention applicable to a motor car seat, is shown in the accompanying drawing in which Figure 1 is a perspective view illustrating a layout for a running seat, only the base of the latter being indicated in broken lines.

Figure 2 shows the interlocking features of the invention on a somewhat larger scale.

The base 2 of the seat in the form illustrated is a frame, and a certain slide cages 3 are secured to it on the underside and these are arranged to rest slidably upon a pair of parallel slide rails 5 which are suitably spaced apart and held down on the floor by bolts 6 in a position enabling the seat to side thereon in a fore-and-aft direction. The cages 3 are conveniently made out of stampings and carry internal sliding saddles (not illustrated) which straddle over the rails 5 and extend partially round the latter, thus preventing the slide cages 3 from being lifted away from said rails, excepting at two appropriate points in each of the latter where lateral slots or flats 7 are made in the rail so as to provide an entry for the saddles of the cages 3 when the seat base 2 is brought into such position as ensures registration of cages 3 and slots 7. This is prevented ordinarily by stop pins 1 passed into holes 4 made in the rails 5.

One of the rails 5 is made to project beyond the front of the seat frame, and the stop or abutment 10 is slidably carried upon such extended portion. (In some cases, the rail could be extended behind the seat instead of projecting forwards, but this is not preferred and therefore need not be described.) The slide cage 3 is provided with a catch hook 12 pivoted at 12A and urged downwardly by a spring 13, which may be of any useful kind, but is here shown to consist of a piece of helical spring passed over the top of the hook 12 and fastened at two fixed points at the sides.

The stop 10 is of the nature of a claw which grips the rail 5 and becomes firmly locked thereon only when tilted and this tilting action, though very slight, is of the greatest possible importance as it constitutes a method of locking the stop in various positions upon the rail 5. For this purpose the stop 10 carries an extension or finger 16 having a threaded hole receiving a thumb screw 15, the latter protruding at the bottom and bearing upon the rail 5 direct, so that the tilting or canting of the stop 10 is accomplished by turning the thumbscrew 15. A comparatively slight movement of the latter tilts or cants the stop 10 upon the rail 5 to cause the stop to effectively grip the rail. The stop or abutment 10 serves also as an adjustable anchorage upon which the hook 12 is adapted to catch automatically when the cage to which it is hinged is moved towards it, thereby holding the seat against backward thrust until the catch hook 12 is deliberately lifted by the hand of the driver of the car to effect disengagement.

It is most essential for safety, to ensure that the hook 12 shall engage properly and with unfailing regularity under all working conditions with the stop 10. The present invention provides means which render such engagement possible irrespective of the relative positions of the engaging members. For this purpose, the top of the stop 10 is provided with a flange or rim 19 having an edge curved so as to be concentric—or approximately so—with the axis of the rail 5 on which it is capable of turning. The stop 10 having the segmental flange 19 will therefore become engaged by the hook 12 even when the two members are circumferentially out of alinement with one another, without incurring the smallest risk of their coming apart accidentally, the flange 19 being practically part of the circumference of a circle, and therefore capable of being gripped by the hook 12 at any point. The shape of the hook 12 is such as to make it easy for the finger to raise it.

It will be readily understood that the stop 10 may alternatively be provided with hook means which are adapted to engage with a flange or rim provided on the member 3.

The arrow $x$ indicates the direction in which the hook 12 descends under the influence of the spring 13 and the broken lines in Fig. 2 show it in its locked position. The double arrow $y$ indicates the directions in which the member 10 may be swung circumferentially without impairing the interengagement of the two members. The stop 10 cannot swing beyond a limited angle owing to the rail 5 being secured very near to the floor, which therefore serves as a stop. The rail 5 is preferably cylindrical in cross-section so that the anchoring member 10 may be more readily slid along the same and angularly moved or tilted into gripping relation thereto.

For the purpose of automatically locking the members 10 and 12 together, the member 12 is provided with a cam portion 20 terminating in a recessed or notched portion 21. As the member 3 carrying the catch or detent 12 is moved forwardly, the cam portion 20 rides over the curved or arcuate edge 19, the member 12 under the action of the spring 13 finally snapping into locking engagement with the flange 19 by receiving the latter within the notched portion 21.

I claim:

1. A device of the character described comprising a guide rail, an anchoring member slidable thereon, a member movable relative thereto, and means for locking said members together; said last named means including a transverse lug portion on one member having an edge extending circumferentially of the direction of travel thereof and a portion on the other of said members coacting with said circumferentially extending edge, whereby to permit of the interengagement of said portions in different relative positions of said members circumferentially of the line of travel thereof.

2. A device of the character described comprising members movable relative to and independently of each other, a guide rail, means for securing one of said members in adjusted position on said guide rail, and coacting relatively movable parts on said members for locking the same together; one of said parts having an arcuate portion extending circumferentially of the direction of travel and the other part having a portion coacting therewith whereby to permit of the interengagement of said portions in different relative positions of said members circumferentially of the line of travel thereof.

3. A device of the character described comprising members movable relative to and independently of each other, a guide rail, means for securing one of said members in adjusted position on the guide rail, and means for locking said members together; said last named means including a portion on one member having an arcuate edge extending circumferentially of the direction of travel thereof and a pivoted portion on the other of said members coacting with said circumferentially extending portion, whereby to permit of the interengagement of said portions in different relative positions of said members circumferentially of the line of travel thereof.

4. A device of the character described comprising a guide rail, an anchoring member slidable therein, a member movable relative to said anchoring member, a portion on one member having an arcuate edge extending circumferentially of the line of travel of the members, and a spring pressed, pivoted detent on the other of said members having a cam portion adapted to ride over said arcuate edge and a notched portion adapted to engage said arcuate edge in various relative positions of said members circumferentially of the line of travel.

5. A device of the character described comprising an anchoring member, a seat member; said members being movable relative to and independently of each other, means for securing said anchoring member in adjusted position, and means for locking said members together; said last named means including a transverse lug portion on one member having an edge extending circumferentially of the direction of travel thereof and a portion on the other of said members coacting with said circumferentially extending edge, whereby to permit of the interengagement of said portions in different relative positions of said members circumferentially of the line of travel thereof.

6. A device of the character described comprising a movable anchoring member, a movable seat member, means for guiding said members along the line of travel thereof, means for securing said anchoring member in adjusted position, and means for detachably securing said seat member to said anchoring member; said last named means including a transverse lug portion on one of said members having an edge extending circumferentially of the direction of travel thereof and a portion on the other of said members coacting with said circumferentially extending edge, whereby to permit of the interengagement of said portions in various relative positions of the members thereof circumferentially of the line of travel.

7. A device of the character described comprising guiding means, an anchoring member slidable thereon, means for securing said anchoring member in position thereon, a seat member slidable relative to said anchoring member, catch means on one of said members, movable means on the other of said members adapted to engage and disengage said catch means; said movable means automatically locking said members together and permitting of the manual releasing of the same; and certain of said last named means having an arcuate portion extending circumferentially of the line of travel of said members to permit of the connection of said members while in various relative positions circumferentially of the line of travel thereof.

8. A device of the character described comprising a guiding member, an anchoring member freely movable thereon and angularly movable into gripping engagement therewith, means for tilting said anchoring member and frictionally retaining the same in adjusted position on said guiding member, a member movable relative to said anchoring member, and means for detachably securing said members together; said last named means including a transverse lug portion on one member having an edge extending circumferentially of the direction of travel thereof and a portion on the other of said members coacting with said circumferentially extending edge, whereby to permit of the interengagement of said portions in different relative positions of said members circumferentially of the line of travel thereof.

9. A device of the character described comprising a guiding member, an anchoring member freely slidable thereon and angularly movable into gripping engagement therewith, means for tilting said anchoring member and frictionally retaining the same in adjusted position on said guiding member, a transverse flange projecting from the upper portion of said anchoring member and having an arcuate edge, a member movable relative to said anchoring member, and means thereon adapted to engage said arcuate edge for detachably securing said members together.

10. A device of the character described comprising a cylindrical guiding rail, an anchoring member slidable thereon, means for securing said anchoring member to said rail, a lug having an arcuate edge projecting from said anchoring member, a seat member slidable on said rail, and a catch pivoted on said seat member and adapted to engage said arcuate edge in various positions of said anchoring member rotatively about said rail.

11. A device of the character described comprising a cylindrical guiding rail, an anchoring member slidably embracing the same and angularly movable into gripping engagement therewith, means for tilting said anchoring member to secure the same in position on the rail, a seat member slidable relative to said anchoring member, a segmental lug on said anchoring member having an arcuate edge extending circumferentially of said rail, and a spring pressed, pivoted detent on said seat member having a cam portion adapted to ride over said arcuate edge and a recessed portion to receive the same.

12. A device of the character described comprising a guide rail, an anchoring member slidably mounted thereon, means for securing the same in a plurality of adjusted positions, a member movable along the line of travel of said anchoring member; said members having a relative movement circumferentially of the line of travel thereof, means including cooperating parts on said anchoring member and said second member movable relative to each other for locking the same together and for unlocking the same, and means included in said last named means for insuring engagement of said parts irrespective of the relative positions of said members circumferentially of the line of travel thereof.

13. A device of the character described comprising a cylindrical guiding rail, an anchoring member slidably embracing the same, means for securing said member in adjusted position thereon, a seat member slidable relative to said anchoring member, a lug on one of said members having an arcuate edge extending circumferentially of said rail, and a spring pressed, pivoted detent on the other of said members having a cam portion adapted to ride over said arcuate edge and a recessed portion to receive the same.

In witness whereof I have signed this specification.

ARTHUR WILLIAM CHAPMAN.